United States Patent [19]
Garza

[11] 3,738,049
[45] June 12, 1973

[54] FISH HOOK AND LIVE BAIT HARNESS

[76] Inventor: Benito Gonzalez Garza, 4806 Urban Street, Corpus Christi, Tex. 78415

[22] Filed: Nov. 12, 1971

[21] Appl. No.: 198,107

[52] U.S. Cl. ............................................. 43/44.4
[51] Int. Cl. .......................................... A01k 83/06
[58] Field of Search .................. 43/44.4, 44.6, 44.2

[56] References Cited
UNITED STATES PATENTS

| | | | |
|---|---|---|---|
| 794,352 | 7/1905 | Gebhardt | 43/44.6 |
| 1,025,695 | 5/1912 | Gibson | 43/44.4 |
| 1,730,957 | 10/1929 | Valiga | 43/44.4 |
| 2,508,559 | 5/1950 | Worthington | 43/44.4 |

*Primary Examiner*—Robert Peshock
*Assistant Examiner*—Daniel J. Leach
*Attorney*—Gustave Miller

[57] ABSTRACT

A fish hook and live bait harness for minnows or other similar size live bait fish, and also for live shrimp bait including a coil spring of resilient wire providing an eye for the fish line, with a pair of shanks extending rearwardly from the coil spring eye, the coil spring eye normally urging the shanks toward each other. In one form, the shanks terminate in curved barbed hooks, the barbed hooks extending forwardly toward the coil spring eye, and in another form, the shanks terminate in toes extending toward each other on which is placed the eye of a treble hook. In each case, an upwardly extending loop is secured on each shank in a plane at right angles to the plane of the shanks, the loop ends passing beyond each other and then providing parallel arms extending parallel to the hook shanks providing bait securing harness extending either forwardly or backwardly. Each arm has a spur at an intermediate point and a stabilizer at the end which extend toward the spur and stabilizer on the other arm. The stabilizers are either sharp points for engaging minnows or small loops for supporting a shrimp tusk. The shank loops and arms provide a harness or saddle for holding live bait. The forwardly extending hook shanks provide head pull, and the rearwardly extending shanks provide tail pull.

9 Claims, 6 Drawing Figures

INVENTOR
Benito G. Garza

BY Gustave Miller
ATTORNEY

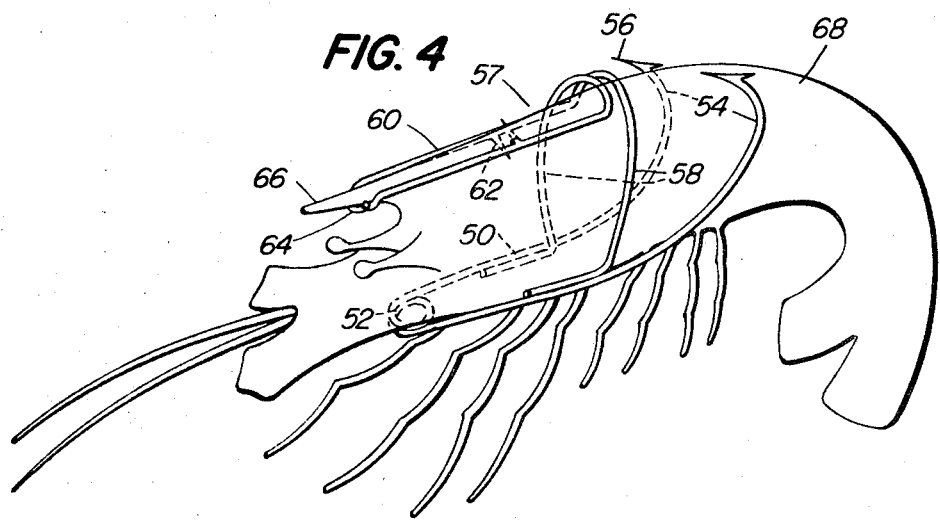
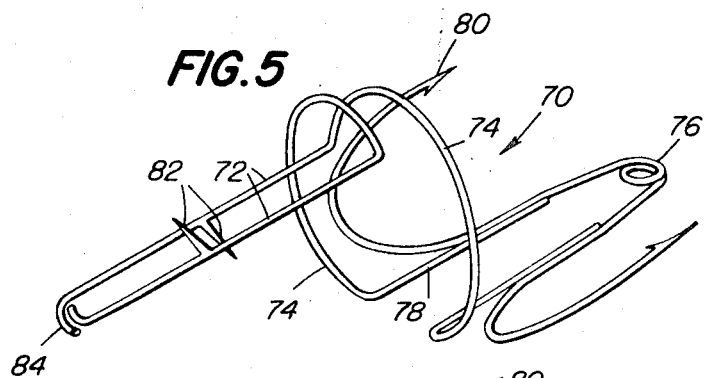
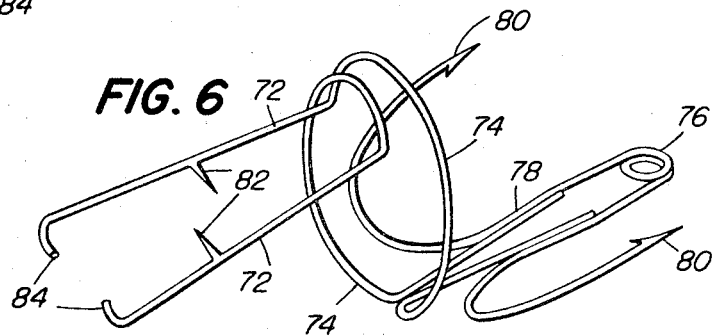

FISH HOOK AND LIVE BAIT HARNESS

OBJECTS OF THIS INVENTION

It is an object of this invention to provide a combination fish hook and a holder harness for live bait, either of the minnow type or the shrimp type which acts as a saddle or harness for the bait, and which may be manufactured to provide the fish line pulling in either the direction of the head or the tail of the bait.

A further object of this invention is to provide a fish hook and live bait holder harness which will hold the bait firmly yet with so little injury, if any, to the bait, that the bait will have sufficient freedom of movement, without the possibility of escape, that the bait will be more attractive to the fish that are being sought.

It is a further object of this invention to provide a fish hook and bait holder harness made of resilient, thin wire for resiliently encompassing and holding the bait, yet which is practically invisible to the fish being sought.

Still a further object of this invention is to provide a fish hook and live bait holder harness wherein the bait can be readily inserted, preferably tail first, and is then resiliently held in the saddle or harness provided by the resilient wires of this invention.

A further object of this invention is to provide a fish hook and bait holder harness in which the minnow or other live bait may be quickly secured in position without time consuming adjustments or fastenings.

A further object of this invention is to provide an improved fish hook and live bait holder harness that is an improvement over previous devices for the same general purpose, such as are shown in U.S. Pat. Nos. 2,508,559; 2,775,058; 2,932,116; 2,938,066; and 3,415,004.

BRIEF DESCRIPTION OF THE DRAWINGS

With the above and related objects in view, this invention consists in the details of construction and combination of parts, as will be more fully understood from the following description, when read in conjunction with the accompanying drawing, in which:

FIG. 4 is a view of a harness providing a head pull holder and rigid fish hook for a live shrimp bait.

FIG. 5 is a view of a tail pull form of the fish hook and live bait holder of this invention, in closed bait holding position.

FIG. 6 is a view of the holder of FIG. 5 in open position for inserting the bait therein, tail first.

DETAILED DESCRIPTION OF THE INVENTION

Figure 1:
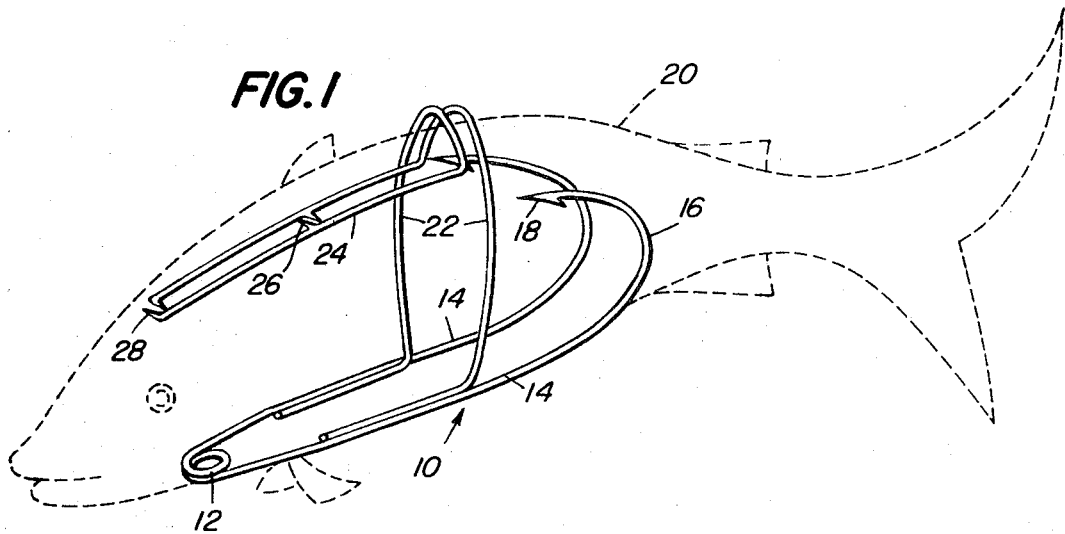
FIG. 1 is a perspective of one form of harness having minnow bait holder and fish hook with rigid hooks, adapted for head pull by the fish line.

There is shown at 10 one form of the fish hook and live bait holder harness of this invention. Each form of hook and holder is made of resilient spring wire, preferably of stainless steel, and fairly thin so as to be substantially invisible to fish when in use in water. The harness 10 consists of a small spring coil 12 which acts as an eye for tying the fish line thereto. Integrally extending rearwardly (opposite the direction of the pull of the fish line to be attached to the coil eye 12) are a pair of shanks 14 which then are curved forwardly at 16 and terminate in barbed fishhooks 18. The curved shanks 16 and hooks 18 are normally urged toward each other by the spring coil eye 12, and assist in securing the live fish bait, such as a minnow 20 therebetween. Secured to each shank 14 in a suitable manner, as by welding, for instance, is a loop 22 extending outwardly and then inwardly, in a plane at right angles to the somewhat parallel shanks 14, the loops 22 extending inwardly beyond each other, and then extending forwardly as arms 24 somewhat parallel to each other and to the shanks 14. About midway of their length, the arms 24 are provided with spurs 26 extending toward each other, and at the ends, in this form they terminate in bait stabilizer points 28. The right arm 24 extends from the left loop 22 and left shank 14, and similarly, the left arm 24 extends from the right loop 22 and right shank 14, and when the bait 20 is not in position, the arms 24 are spread apart, and the shanks 14 are practically touching each other, similar to the position shown in FIG. 6, the open position. To insert the minnow 20 into the saddle or harness 10 provided by this invention, the minnow fish bait 20 is inserted through the loops 22 while somewhat squeezing the arms 24 toward each other, enlarging the circle provided by the loops 22 against the urging of the eye spring coil 12. The bait 20 is also squeezed between the hook shanks 16, and when forced into position, the action of the coil spring eye 12 holds the hook shanks 16 and the loops 22 in bait holding position, with the spurs 26 and stabilizer points 28 pressing into in slight but holding contact with the bait, sufficient to hold the bait 20 against escape or loss, but permitting some movement on the part of the bait, making it more attractive to the fish that are being sought.

Figure 2:
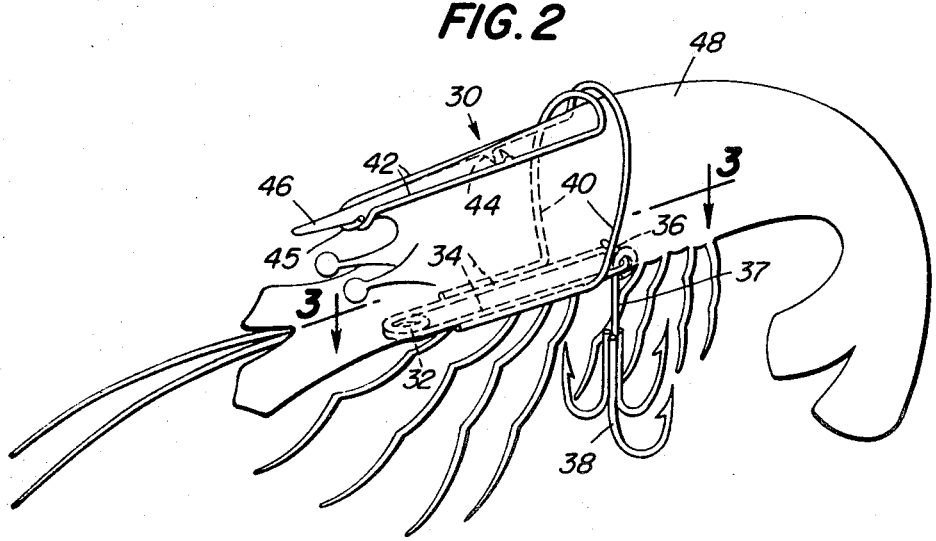
FIG. 2 is a view of a head pull holder harness for a shrimp, using a treble hook suspended thereon.

In FIG. 2, the holder or harness 30 is basically the same as that at 10 in FIG. 1. However, instead of rigid curved hook shanks 16 and barbed hooks 18, the holder 30 has its spring coil eye 32 provided with extending shanks 34 terminating in inwardly extending toes 36 which act as a carrier for a stem 37 of a conventional treble hook 38. Similar loops 40 have similar extending arms 42 and midway spurs 44. At their ends, however, the arms 42 have small loops 45 in a plane at right angles thereto to fit under the tusk 46 of a live shrimp bait 48.

In FIG. 4, the shanks 50 extending from the spring coil eye 52 extend into curved rigid hook shanks 54 with barbed hooks 56 at the ends thereof. However, this harness 57 is otherwise identical with that at 30, with similar loops 58 extending beyond each other and then forwardly into arms 60 with spurs 62 and small loops 64 for placing under the tusks 66 of the shrimp bait 68.

In FIGS. 5 and 6, this invention is the same as in FIG. 4, except that the holder harness 70 has its stabilizer arms 72 extend rearwardly from the loops 74 and the spring coil eye 76 with its shanks 78, and the hooks 80 integral therewith.

In FIG. 6, the holder is shown in open position, as when no bait is present, while in FIG. 5, the holder is shown in closed position, as though a bait were held therein, as it is in FIGS. 1, 2 and 4. As shown in these two FIGS. 5 and 6, the rearwardly extending arms and stabilizers hold the bait in the opposite direction from that in the other figures, and thus provide for "tail" pull instead of "head" pull as in FIGS. 1 – 4.

Obviously, both the treble hook of FIG. 2 and the rigid hook of FIGS. 1, 4, 5 and 6 could be used on the same fish hook and live bait holder by merely placing the eye of the treble hook 38 over the barbed hook onto the shank of the hook and adding an obstruction on the shank to prevent accidental loss, if necessary.

OPERATION

In operation, the holder, when unoccupied, is normally in the open position shown in FIG. 6. The bait is merely inserted through the loops, preferably tail first, with the head in the direction of the stabilizer arms. As the bait is inserted, the loops will spread somewhat and the stabilizer arms will approach each other, the spurs and ends on the stabilizer arms slightly pinching or catching the body of the bait, to thus hold the bait in position. With shrimp bait, the small loops on the end of the stabilizer arms are extended under the shrimp tusks, as shown. In the forms shown in FIGS. 1 – 4, the bait will be held in head pull position, while in the form in FIGS. 5 and 6, the bait will be held in tail pull position.

ABSTRACT OF THE DRAWINGS

Figure 3:
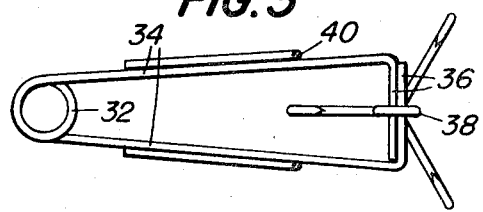
FIG. 3 is a section view on line 3—3 of FIG. 2.

In the drawings, the members refer to like parts, and for purposes of explication, marshalled below are the numbered parts of the improved fish hook and live bait harness:

10 head pull minnow bait holder and fish hook harness
12 spring coil fish line eye
14 shanks from coil 12
16 curved fish hook
18 barbed fish hooks
20 live minnow bait
22 loop secured to shank 14 in plane at right angles thereto
24 arms extending from loops 22
26 fish holding spurs
28 bait stabilizer points on 24
30 head pull live shrimp bait holder harness of FIGS. 2 and 3
32 spring coil eye
34 shank from 32
36 inwardly extending toes on 34
37 stem dangling from 36
38 conventional treble hook
40 loops on 34
42 arms on 40
44 spurs on 42
45 small loops on 42 under 46 in a plane at right angles thereto
46 shrimp tusk
48 live bait shrimp
50 arms on eye coil 52 of FIG. 4
52 eye spring coil
54 curved shanks
56 barbed hooks
57 harness of FIG. 4
58 loops from arms 50
60 arms from loops 58
62 spurs on 60
64 small loops on arms 60
66 tusk of shrimp 68
68 live shrimp bait
70 holder or harness of tail pull form of FIGS. 5 and 6
72 stabilizer arms from 74
74 loops on shanks 78
76 spring eye coil of FIGS. 5 and 6
78 shank from 76
80 hooks secured to shank 78
82 spurs on 72
84 small tusk loops on 72

Although this invention has been described in considerable detail, such description is intended as being illustrative rather than limiting, since the invention may be variously embodied, and the scope of the invention is to be determined as claimed.

Having thus set forth the nature of this invention, what is claimed is:

1. A fish hook and live bait holder harness (10, 30, 57, 74) comprising a spring coil fish line receiving eye (12, 32, 52, 76), a pair of substantially parallel shanks (14, 34, 50, 78) extending rearwardly from said eye, barbed reverse curved hook means (18, 38, 56, 80) on said shanks, a bait enclosing loop (22, 40, 58, 74) extending from each shank in a plane substantially at right angles to the plane of said shank, each loop extending toward and then beyond the other loop and then extending at right angles to the plane of the loops as substantially parallel arms (24, 42, 60, 72), each arm having an intermediately located bait securing spur (26, 44, 62, 84) extending toward the other, each said arm terminating in a bait stabilizer (28, 45, 64, 84).

2. The harness of claim 1, said stabilizer being pointed (28) to press against and hold a live minnow bait (20).

3. The harness of claim 1, said stabilizer being curved (45, 64, 84) in a plane at right angles to said arms to engage under a live bait shrimp tusk (46, 66).

4. The harness of claim 1, said hook means comprising a stem (37) dangling from said shanks (34) and multiple barbed reverse hooks (38) on said stem.

5. The harness of claim 1, said hook means comprising barbed reverse hooks (18, 38, 54, 80) extending rearward from said coil spring eye.

6. The harness of claim 5, each reverse hook (18, 54, 84) being integral with said shank (14, 50, 72) from said coil spring eye.

7. The harness of claim 5, said coil spring eye (12, 32, 52, 84) urging said arms (24, 34, 50, 78), spurs and stabilizers toward each other into bait gripping position.

8. The harness of claim 1, said arms (24, 42, 60) extending forward from said loops providing a head pull position.

9. The harness of claim 1, said arms (72) extending rearwardly from said loops (74) providing a tail pull position.

* * * * *